United States Patent
Park

(10) Patent No.: US 10,501,006 B2
(45) Date of Patent: *Dec. 10, 2019

(54) LAMP FOR VEHICLE AND VEHICLE

(71) Applicant: LG Electronics Inc., Seoul (KR)

(72) Inventor: Seongho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 15/856,688

(22) Filed: Dec. 28, 2017

(65) Prior Publication Data

US 2018/0354406 A1   Dec. 13, 2018

(30) Foreign Application Priority Data

Jun. 9, 2017  (KR) .................. 10-2017-0072745

(51) Int. Cl.
*B60Q 1/04*    (2006.01)
*B60Q 1/14*    (2006.01)
*B60Q 1/076*   (2006.01)
*B60Q 1/068*   (2006.01)

(52) U.S. Cl.
CPC ............. *B60Q 1/076* (2013.01); *B60Q 1/068* (2013.01)

(58) Field of Classification Search
CPC .......... B60Q 1/076; B60Q 1/068; B60Q 1/04; B60Q 1/14; B60Q 1/1423
See application file for complete search history.

(56) References Cited

U.S. PATENT DOCUMENTS

| | | | |
|---|---|---|---|
| 9,999,999 B2 | 6/2018 | Bazzo | |
| 2011/0215369 A1* | 9/2011 | Brick | H01L 33/20 257/99 |
| 2014/0078757 A1 | 3/2014 | Chen et al. | |
| 2015/0146448 A1* | 5/2015 | Han | F21S 41/143 362/522 |

(Continued)

FOREIGN PATENT DOCUMENTS

| | | |
|---|---|---|
| DE | 102005041065 | 8/2006 |
| DE | 102014226650 | 6/2016 |

(Continued)

OTHER PUBLICATIONS

European Search Report in European Application No. 18176430.9, dated Nov. 6, 2018, 12 pages.

*Primary Examiner* — Thai Pham
(74) *Attorney, Agent, or Firm* — Fish & Richardson P.C.

(57) ABSTRACT

A lamp for a vehicle includes a light generation unit with an array module having a plurality of micro Light Emitting Diode (micro-LED) elements. The lamp also includes at least one processor and a computer-readable medium having stored thereon instructions that, when executed, cause the at least one processor to: control the light generation unit to form a light distribution pattern that, when projected on a vertical plane at a first distance, has a luminous intensity that is progressively smaller from a central point closer to a center towards a peripheral point further from the center. Controlling the light generation unit to form the light distribution pattern includes: controlling at least one first micro-LED element to generate a first luminous intensity at the central point, and controlling at least one second micro-LED element to generate a second luminous intensity at the peripheral point.

20 Claims, 15 Drawing Sheets

(56) References Cited

U.S. PATENT DOCUMENTS

2018/0014395 A1\* 1/2018 Ichikawa ................ F21S 41/00
2018/0170243 A1\* 6/2018 Mizuno ................... B60Q 1/14

FOREIGN PATENT DOCUMENTS

| EP | 2752615 | 7/2014 |
| EP | 3127747 | 2/2017 |
| FR | 3039880 | 2/2017 |
| JP | 2013054956 A | 3/2013 |
| JP | 2015-500562 | 1/2015 |
| JP | 2017011259 A | 1/2017 |
| KR | 2014112180 A | 9/2014 |
| WO | 2006-034329 | 3/2006 |
| WO | 2012-162713 | 12/2012 |

\* cited by examiner

FIG. 8
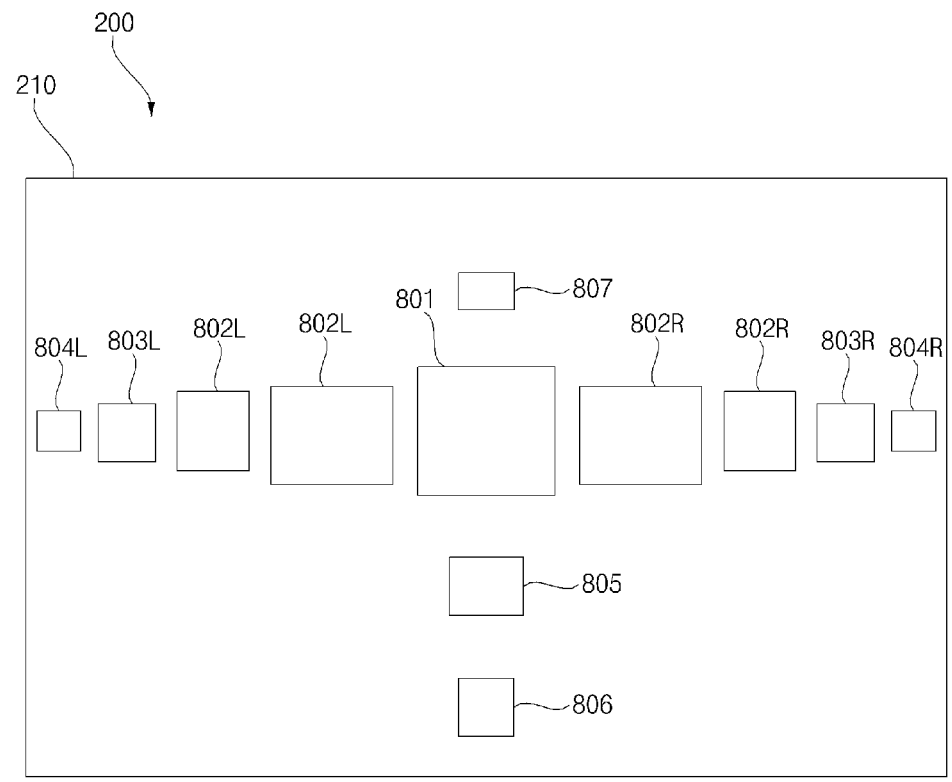
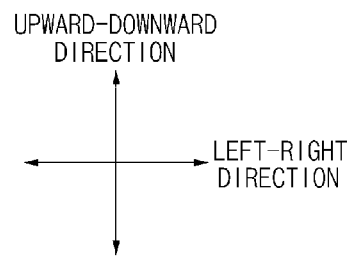

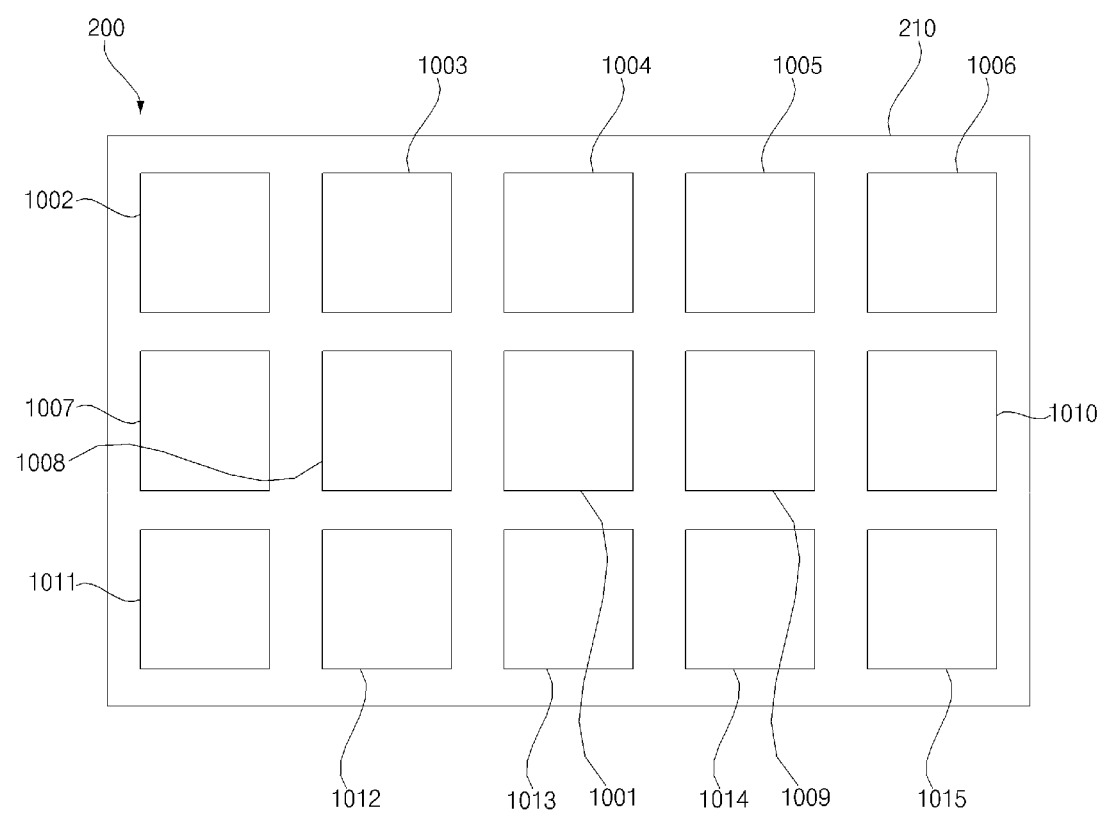

FIG. 12B
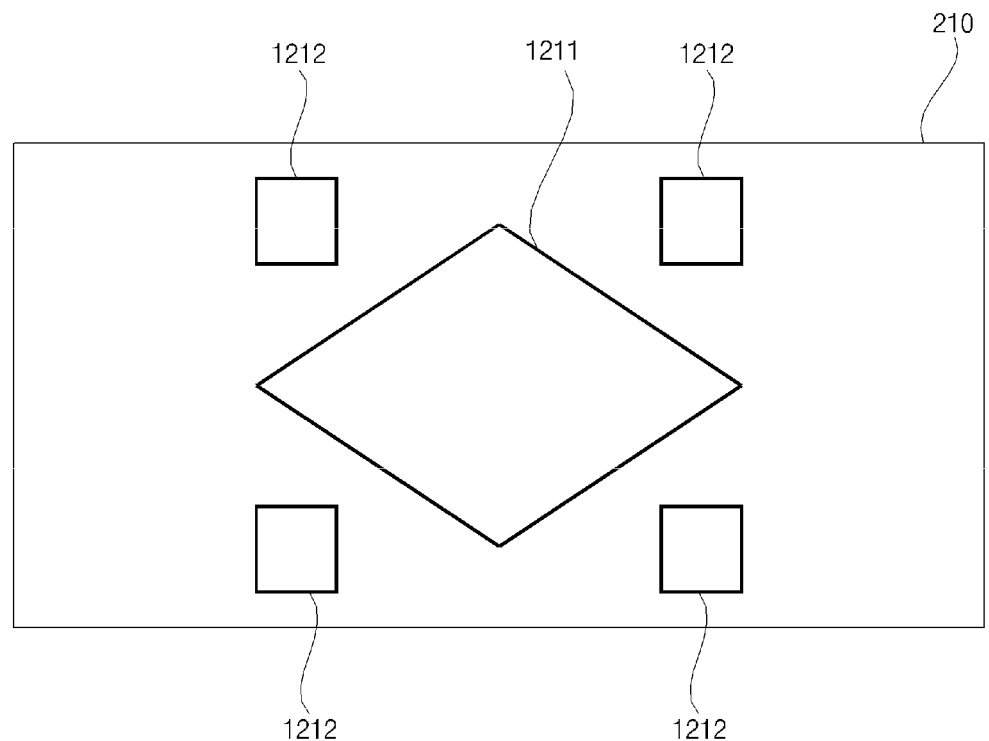
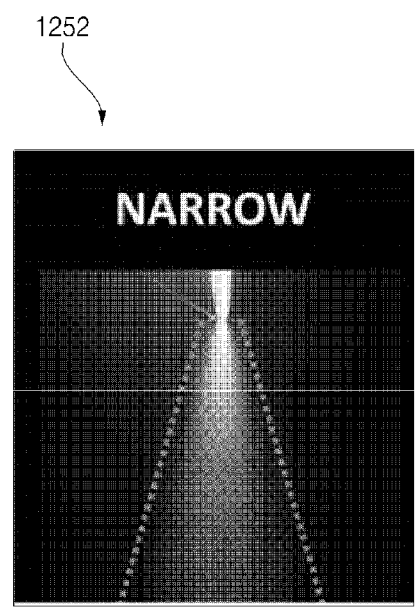

LAMP FOR VEHICLE AND VEHICLE

CROSS-REFERENCE TO RELATED APPLICATION

This application claims the benefit of an earlier filing date and right of priority to Korean Patent Application No. 10-2017-0072745, filed on Jun. 9, 2017 in the Korean Intellectual Property Office, the disclosure of which is incorporated herein by reference.

TECHNICAL FIELD

The present disclosure relates to a lamp for a vehicle, and a vehicle.

BACKGROUND

A vehicle is an apparatus that moves in a direction desired by a user riding therein. A representative example of a vehicle is an automobile.

A vehicle typically includes various lamps. For example, a vehicle typically includes a head lamp for illuminating a forward area of the vehicle, a rear combination lamp, and a fog lamp.

Such lamps for a vehicle may be classified as lamps for facilitating visibility for a driver (e.g., a head lamp and a fog lamp), and lamps for notifying a simple signal (e.g., a rear combination lamp).

SUMMARY

Implementations disclosed herein provide a lamp for a vehicle that implements a plurality of micro Light Emitting Diode (micro-LED) elements to generate a light distribution pattern.

In one aspect, a lamp for a vehicle includes: a light generation unit including an array module on which a plurality of micro Light Emitting Diode (micro-LED) elements is disposed; at least one processor; and a computer-readable medium having stored thereon instructions that, when executed by the at least one processor, cause the at least one processor to perform operations including: controlling the light generation unit to form a first light distribution pattern that, when projected on a vertical plane at a first distance from the light generation unit, has a luminous intensity that is progressively smaller from a central point that is closer to a center of the first light distribution pattern towards a peripheral point that is further from the center of the first light distribution pattern. Controlling the light generation unit to form the first light distribution pattern includes: controlling at least one first micro-LED element of the light generation unit to generate a first luminous intensity at the central point of the first light distribution pattern; and controlling at least one second micro-LED element of the light generation unit to generate a second luminous intensity at the peripheral point of the light distribution pattern.

In some implementations, the central point is a point locate at the center of the first light distribution pattern that, when projected on the vertical plane at the first distance from the light generation unit, has the highest luminous intensity among points in the first light distribution pattern.

In some implementations, controlling the light generation unit to form the first light distribution pattern further includes: forming the first light distribution pattern that, when projected on the vertical plane at the first distance from the light generation unit, is vertically symmetric with respect to a vertical centerline of the first light distribution pattern.

In some implementations, controlling the light generation unit to form the first light distribution pattern further includes: forming the first light distribution pattern that, when projected on the vertical plane at the first distance from the light generation unit, has a luminous intensity that is progressively smaller from the central point to a first point, and from the first point to a second point of the first light distribution pattern. The first point and the second point are arranged on a horizontal centerline of the first light distribution pattern. The first point is a point at which an angle between a reference line, connecting the light generation unit and the central point, and a first virtual line, connecting the light generation unit and the first point, is 5 degrees with respect to the light generation unit. The second point is a point at which an angle between the reference line and a second virtual line, connecting the light generation unit and the second point, is 10 degrees with respect to the light generation unit. The first distance is from 2 m to 4 m.

In some implementations, controlling the light generation unit to form the first light distribution pattern further includes: forming the first light distribution pattern that, when projected on the vertical plane at the first distance from the light generation unit, has a luminous intensity at the first point that is 90% of the luminous intensity at the central point, and a luminous intensity at the second point that is 35% of the luminous intensity at the central point.

In some implementations, controlling the light generation unit to form the first light distribution pattern further includes: forming the first light distribution pattern that, when projected on the vertical plane at the first distance from the light generation unit, has a luminous intensity at a third point that is smaller than a luminous intensity at the first point, and that is 20% of a luminous intensity of the central point. The first and third points are on a same vertical line. The third point is a point at which an angle between the reference line and a third virtual line, connecting the light generation unit and the third point, is 5 degrees in a horizontal direction and 10 degrees in a vertical direction with respect to the light generation unit.

In some implementations, controlling the light generation unit to form the first light distribution pattern further includes: forming the first light distribution pattern that, when projected on the vertical plane at the first distance from the light generation unit, is horizontally symmetric with respect to the horizontal centerline of the first light distribution pattern.

In some implementations, controlling the light generation unit to form the first light distribution pattern further includes: forming the first light distribution pattern that, when projected on the vertical plane at the first distance from the light generation unit, has a luminous intensity at a fourth point that is 70% of the luminous intensity of the central point. The fourth point is on the vertical centerline and is a point at which an angle between a reference line, connecting the light generation unit and the central point, and a fourth virtual line, connecting the light generation unit and the fourth point, is 5 degrees with respect to the light generation unit.

In some implementations, controlling the light generation unit to form the first light distribution pattern further includes: forming the first light distribution pattern that, when projected on the vertical plane at the first distance from the light generation unit, has a luminous intensity that is progressively smaller from the fourth point to a fifth point, and from the fifth point to a sixth point on the first light distribution pattern. The fourth to sixth points are formed on a same horizontal line. The fifth point is a point at which an angle between the reference line and a fifth virtual line, connecting the light generation unit and the fifth point, is 10 degrees in a horizontal direction and 5 degrees in a vertical direction with respect to the light generation unit. The sixth point is a point at which an angle between the reference line and a sixth virtual line, connecting the light generation unit and the sixth point, is 20 degrees in a horizontal direction and 5 degrees in the vertical direction with respect to the light generation unit.

In some implementations, controlling the light generation unit to form the first light distribution pattern further includes: forming the first light distribution pattern that, when projected on the vertical plane at the first distance from the light generation unit, has a luminous intensity at the fifth point that is 20% of the luminous intensity at the central point, and a luminous intensity at the sixth point that is 10% of the luminous intensity at the central point.

In some implementations, the first distance is 3 m.

In some implementations, the array module includes: a base; and a plurality of subarrays disposed on the base. Each of the plurality of subarrays has a different size according to a region where the subarray is disposed on the base.

In some implementations, among the plurality of subarrays, a first subarray positioned closer to a center of the base has a size that is greater than a size of a second subarray positioned further from the center of the base.

In some implementations, the array module includes a first region and a second region. The plurality of micro-LED elements includes: a first plurality of micro-LED elements disposed in the first region with a first density; and a second plurality of micro-LED elements disposed in the second region with a second density.

In some implementations, the array module has the plurality of micro-LED elements disposed with a density that is progressively smaller from a central region to a peripheral region of the array module.

In some implementations, controlling the light generation unit to form the first light distribution pattern includes: supplying a first amount of electrical energy to a first region of the array module; and supplying a second amount of electrical energy to a second region of the array module.

In some implementations, controlling the light generation unit to form the first light distribution pattern includes: supplying electrical energy of an amount that is progressively smaller from a central region of the array module to a peripheral region of the array module.

In some implementations, the array module includes: a base; and a plurality of subarrays disposed on the base. Each of the plurality of subarrays has a different shape according to a region where the subarray is disposed on the base.

In some implementations, the lamp is configured to operate as a rear combination lamp of the vehicle.

In another aspect, a vehicle includes: a plurality of wheels; a power source configured to drive a rotation of at least one of the plurality of wheels; and a lamp. The lamp includes: a light generation unit including an array module on which a plurality of micro Light Emitting Diode (micro-LED) elements is disposed; at least one processor; and a computer-readable medium having stored thereon instructions that, when executed by the at least one processor, cause the at least one processor to perform operations including: controlling the light generation unit to form a first light distribution pattern that, when projected on a vertical plane at a first distance from the light generation unit, has a luminous intensity that is progressively smaller from a central point that is closer to a center of the light distribution pattern towards a peripheral point that is further from the center of the first light distribution pattern. Controlling the light generation unit to form the first light distribution pattern includes: controlling at least one first micro-LED element of the light generation unit to generate a first luminous intensity at the central point of the first light distribution pattern; and controlling at least one second micro-LED element of the light generation unit to generate a second luminous intensity at the peripheral point of the light distribution pattern.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 8 is a diagram illustrating an example of an array module according to an implementation;

FIG. 10B is a diagram illustrating an example of an array module according to an implementation;

FIGS. 12A and 12B are diagrams illustrating examples of an array module according to an implementation.

DETAILED DESCRIPTION

A lamp for a vehicle may use various types of elements as light sources. In some implementations, a lamp may utilize a plurality of micro Light Emitting Diode (micro-LED) elements as light sources.

In some implementations, a lamp may utilize a few hundred to tens of thousands of micro LED elements as light sources. As such, it may be important to operate micro-LEDs efficiently, while at the same time generating sufficient output levels and output patterns of light for vehicle safety and to satisfy vehicular regulations.

Implementations of the present disclosure address the above challenges by providing a lamp for a vehicle that is designed to operate efficiently by utilizing a plurality of micro Light Emitting Diode (micro-LED) elements to generate a particular light distribution pattern. Such a lamp may be implemented, for example, in a rear combination lamp for a vehicle.

In some scenarios, implementations of the present disclosure may have one or more effects as follows.

First, by utilizing a plurality of micro-LED elements, a lamp may secure a quantity of light that is sufficient for vehicle operations.

Second, the plurality of micro-LED elements may be configured to attain a light distribution range suitable for functions of a lamp for a vehicle.

Third, the plurality of micro-LED elements may be configured to form a particular light distribution pattern, and thus help minimize eye strain of a driver in a vehicle following behind, as well as to increase intensity of signal transmission.

Effects of the present disclosure are not limited to the aforementioned effects and other unmentioned effects will be clearly understood by those skilled in the art from the claims.

A vehicle as described in this specification may be any suitable motorized vehicle and may include, for example, an automobile and a motorcycle. Hereinafter, a description will be given based on an automobile.

A vehicle as described in this specification may be powered by any suitable source of power, and may include, for example, an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
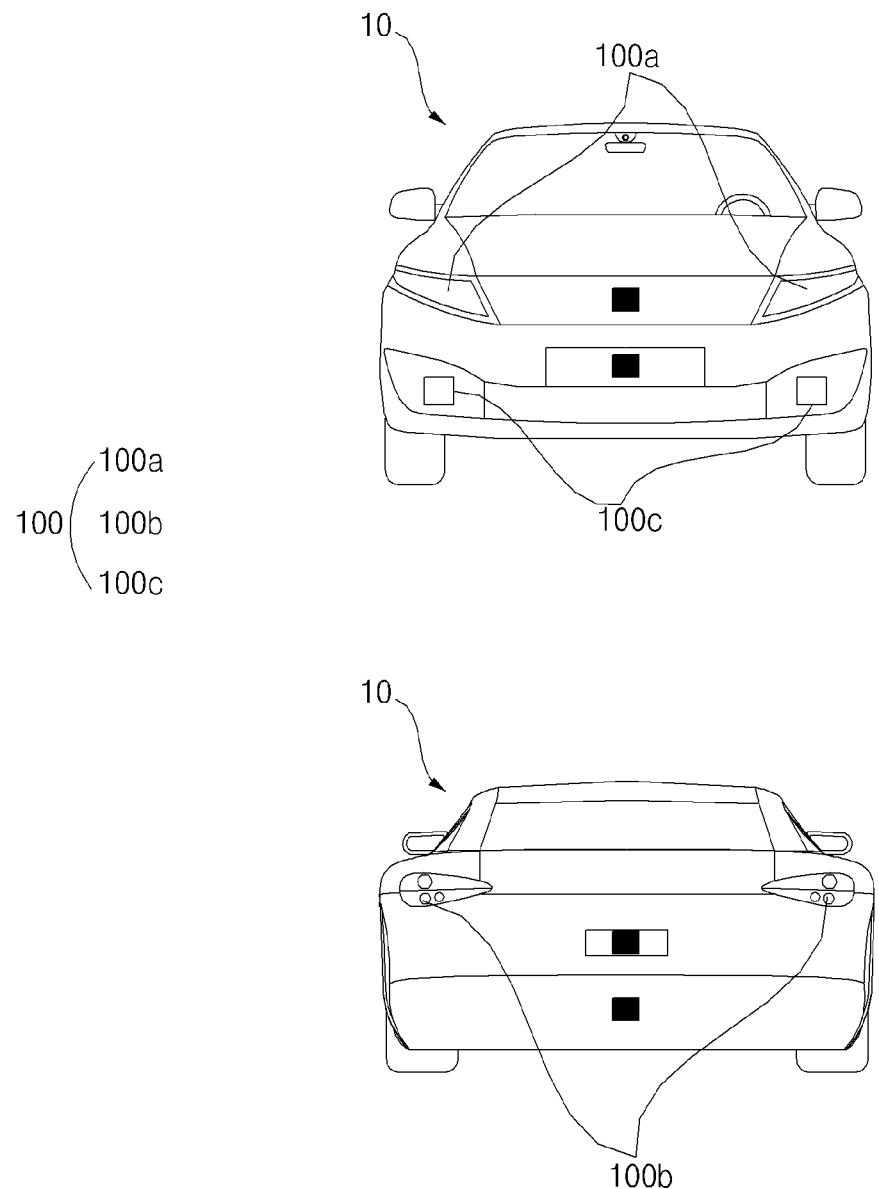
FIG. 1 is a diagram illustrating an example of the exterior appearance of a vehicle according to an implementation.

FIG. 1 is a diagram illustrating the exterior appearance of a vehicle according to an implementation.

Referring to FIG. 1, a vehicle 10 may include a lamp 100 for a vehicle.

The lamp 100 may include a head lamp 100a, a rear combination lamp 100b, and a fog lamp 100c.

The lamp 100 may further include a room lamp, a turn signal lamp, a daytime running lamp, a back lamp, and a positioning lamp.

In the following description, the lamp 100 will be described using an example of the rear combination lamp 100b.

Under the control of a processor 170 (see FIG. 2), a light generation unit 160 (see FIG. 2) may generate light to implement the rear combination lamp 100b.

Under the control of at least one processor, such as the processor 170, the light generation unit 160 may generate light to implement the rear combination lamp 100b.

In some implementations, the lamp 100 may be implemented as a rear combination lamp for a vehicle.

As used herein, the term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

Figure 2:
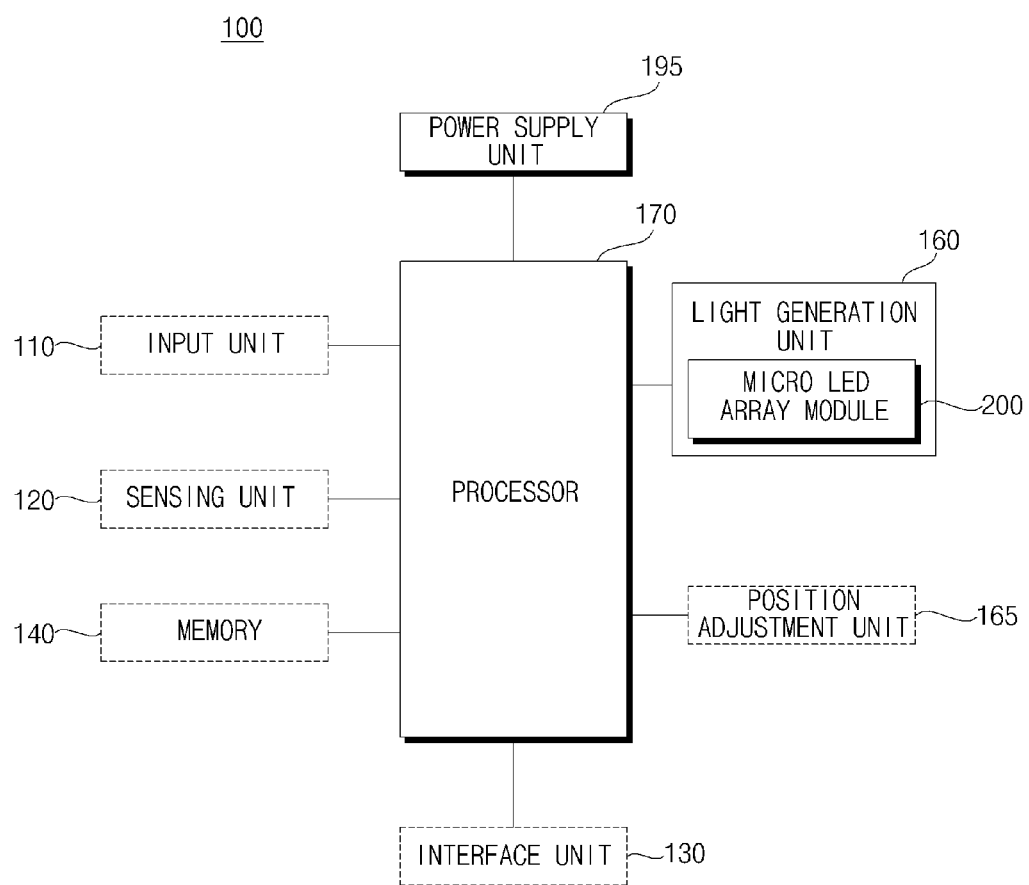
FIG. 2 is a block diagram illustrating an example of a lamp for a vehicle according to an implementation.

FIG. 2 is a block diagram illustrating a lamp for a vehicle according to an implementation.

Referring to FIG. 2, the lamp 100 may include a light generation unit 160, a processor 170, and a power supply unit 190.

The lamp 100 may further include an input unit 110, a sensing unit 120, an interface unit 130, one or more memory elements such as a memory 140, and a position adjustment unit 165 individually or in combination.

The input unit 110 may receive a user input to control the lamp 100.

The input unit 110 may include one or more input devices. For example, the input unit 110 may include one or more of a touch input device, a mechanical input device, a gesture input device, and a voice input device.

The input device 110 may receive a user input to control operation of the light generation unit 160.

For example, the input unit 110 may receive a user input to control turning on or off the light generation unit 160.

The sensing unit 120 may include one or more sensors.

For example, the sensing unit 120 may include a temperature sensor or an illumination sensor.

The sensing unit 120 may acquire temperature information of the light generation unit 160.

The sensing unit 120 may acquire external illumination information of the vehicle 10.

The interface unit 130 may exchange information, data, or a signal with another device provided in the vehicle 10.

The interface unit 130 may transmit information, data, or a signal, received from another device provided in the vehicle 10, to the processor 170.

The interface unit 130 may transmit information, data, or a signal, generated in the processor 170, to another device provided in the vehicle 10.

The interface unit 130 may receive driving situation information.

The driving situation information may include at least one of: information regarding an object located outside of the vehicle 10, navigation information, and vehicle state information.

The information regarding an object located outside of the vehicle 100 may include: information regarding the presence of the object, information regarding a location of the object, information regarding movement of the object, information regarding a distance between the vehicle 10 and the object, information regarding a speed of the vehicle 10 relative to the object, and information regarding a type of the object.

The object information may be generated by an object detection apparatus provided in the vehicle 10. The object detection apparatus may detect an object based on sensing data generated by one or more sensors of: a camera, a radar, a lidar, an ultrasonic sensor, and an infrared sensor.

The object may include a line, a nearby vehicle, a pedestrian, a two-wheeled vehicle, a traffic signal, a light, a road, a structure, a bump, a geographical feature, and an animal.

The navigation information may include at least one selected from among map information, information regarding a set destination, information regarding a route to the set destination, and information regarding various object located along the route, lane information, and information regarding the current location of the vehicle 10.

The navigation information may be generated by a navigation apparatus provided in the vehicle 10.

The vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The vehicle state information may be generated based on sensing information of various sensors provided in the vehicle 10.

One or more memory elements, such as memory 140, may store various types of information, such as basic data for each unit of the lamp 100, control data for the operational control of each unit of the lamp 100, and input/output data of the lamp 100.

The memory 140 may be any of various hardware storage devices, such as a ROM, a RAM, an EPROM, a flash drive, and a hard drive.

The memory 140 may store various data for the overall operation of the lamp 100, such as programs for the processing or control of the processor 170.

The memory 140 may be a subordinate element of the processor 170.

Under the control of the processor 170, the light generation unit 160 may convert electrical energy into light energy.

The light generation unit 160 may include an array module 200 on which a plurality of micro Light Emitting Diode (LED) elements is disposed.

A micro LED element is an LED chip of a few micrometer (um). For example, the size of a micro LED element may be 5 to 15 um.

The array module 200 may include a substrate and a subarray in which the plurality of micro LED elements is disposed. The array module 200 may include one or more subarrays.

The subarray may be in any of various shapes.

For example, the subarray may be in a shape of a figure-having a predetermined area.

For example, the subarray may have a circular shape, a polygonal shape, a fan shape, or the like.

It is desirable that the substrate includes a Flexible Copper Clad Laminated (FCCL) substrate.

The array module 200 in which the plurality of micro LED elements is disposed will be described in more detail with reference to FIG. 6 and its following drawings.

The light generation unit 160 may form a first light distribution pattern with light that is generated by the plurality of micro LED elements.

The first light distribution pattern may be defined as a pattern that is formed on a vertical plane, such as a screen, that is located a particular distance when light generated by the light generation unit 160 is emitted to the vertical plane.

For example, the vertical plane may be defined as a virtual screen in the sense that the vertical plane represents a plane on which light would project based on an actual screen being placed at the location of the vertical plane.

The vertical plane may be referred to as a light distribution screen.

The vertical plane may be located at a first distance from the light generation unit 160. The first distance may be, for example, a distance that facilitates measurement of the light distribution pattern of a vehicle lamp. In some scenarios, the distance may be specified by vehicular regulations that specify a light output quantity and/or light output pattern of a vehicular lamp at a particular distance.

For example, the vertical plane may be located at a first distance that is from 2 m to 4 mm. In some implementations, the first distance is desirably 3 m.

In some scenarios, when a vertical plane (e.g., a screen) is at a distance of 2 m to 4 m from a light source, this may facilitate seeing a light distribution pattern of a rear combination lamp projected on the vertical plane.

By contrast, in some scenarios it may be more difficult to secure a sufficient light distribution area within a distance less than 2 m from a light source. And in some scenarios, when light is distributed at a distance greater than 4 m from a light source, it is difficult to measure luminous intensity of the light.

The examples that follow will describe light distribution patterns that are based on a projection onto a vertical plane (e.g., a screen) that is located at a first distance from the light generation unit.

In some implementations, the lamp may be configured so that the first light distribution pattern formed on a vertical plane at a first distance from the light generation unit has a luminous intensity that is gradually smaller from a central point to a peripheral point of the light distribution pattern.

The central point may be defined as the center of the first light distribution pattern, and may be a point on the vertical plane at which light generated by the light generation unit 160 has the highest luminous intensity.

Alternatively, the central point may be defined as the point corresponding to the shortest distance from the light generation unit 160 to the vertical plane.

The first light distribution pattern may be specified either as a luminous intensity or as a luminous intensity ratio between a plurality of points relative to a central point on the vertical plane at the first distance.

In some implementations, the light generation unit 160 may be adjustable. For example, position adjustment unit 165 may adjust a position of the light generation unit 160.

The position adjustment unit 165 may control the light generation unit 160 to be tilted. Due to the tilting control of the light generation unit 160, output light may be adjusted in an upward-downward direction (e.g., the overall height direction).

The position adjustment unit 165 may control the light generation unit 160 to be panned. Due to the panning control of the light generation unit 160, output light may be adjusted in a left-right direction (e.g., the overall width direction).

The position adjustment unit 165 may further include a driving force generation unit (e.g., a motor, an actuator, and a solenoid) that provides a driving force required to adjust a position of the light generation unit 160.

When the light generation unit 160 generates a low beam, the position adjustment unit 165 may adjust a position of the light generation unit 160 so as to output light further downward as compared to the case where the light generation unit 160 generates a high beam.

When the light generation unit 160 generates a high beam, the position adjustment unit 165 may adjust a position of the light generation unit 160 so as to output light more upward than the case where the light generation unit 160 generates a low beam.

The processor 170 may be electrically connected to each unit of the lamp 100. The processor 170 may control overall operation of each unit of the lamp 100.

The processor 170 may control the light generation unit 160.

The processor 170 may control the light generation unit 160 so as to form a first light distribution pattern.

By adjusting an amount of electrical energy to be supplied to the light generation unit 160, the processor 170 may control the light generation unit 160.

The processor 170 may supply a different amount of electrical energy to each region of the array module 200.

For example, the processor 170 may supply electrical energy whose amount is gradually smaller from the center to the periphery of the array module 200.

The processor 170 may receive driving situation information through the interface unit 130.

The processor 170 may receive object information through the interface unit 130.

The object information may be external light information.

For example, the processor 170 may acquire external light information that is acquired by processing an image captured by a camera.

The processor 170 may acquire external light information based on data generated by the sensing unit 120.

The processor 170 may control the light generation unit 160 based on the external light information so as to form a first light distribution pattern.

The processor 170 may control the light generation unit 160 so that light generated by the light generation unit 160 is combined with external light to form the first light distribution pattern.

The processor 170 may acquire external light information of each region external to the vehicle 10.

The processor 170 may determine an amount of light required to be output to each external region so as to form the first light distribution pattern.

The processor 170 may control the light generation unit 160 so that a different amount of light required for each external region is output to form the first light distribution pattern.

For example, based on the above determination, the processor 170 may adjust an amount of electrical energy to be supplied to a plurality of micro LED elements (e.g., a first subarray), which emits light to a first region external to the vehicle 10, and may adjust an amount of electrical energy to a plurality of micro LED elements (e.g., a second subarray), which emits light to a second region external to the vehicle 10.

In some implementations, external light may be light generated by a streetlight or a lamp of a nearby vehicle.

The processor 170 may adjust the first light distribution pattern based on driving situation information.

For example, the processor 170 may adjust the first light distribution pattern based on navigation information.

For example, the processor 170 may adjust the first light distribution pattern based on information regarding a roadway in which the vehicle 100 is travelling.

For example, when the vehicle 100 is travelling in a highway, the processor 170 may adjust the first light distribution pattern so that light is output with a narrower width and a longer length.

As another example, when the vehicle 100 is travelling in an urban setting, such as in a city downtown, the processor 170 may adjust the first light distribution pattern so that light is output with a wider width and a shorter length.

For example, the processor 170 may adjust the first light distribution pattern based on object information.

For example, when the vehicle 10 receives information regarding a nearby vehicle travelling in a lane next to a lane in which the vehicle 100 is now travelling, the processor 170 may control the light generation unit 160 to output light in the lane in which the vehicle 10 is travelling.

Under the control of the processor 170, the power supply unit 190 may supply electrical energy to each unit of the lamp 100. In particular, the power supply unit 190 may be supplied with power from a battery inside the vehicle 10.

Figure 3:
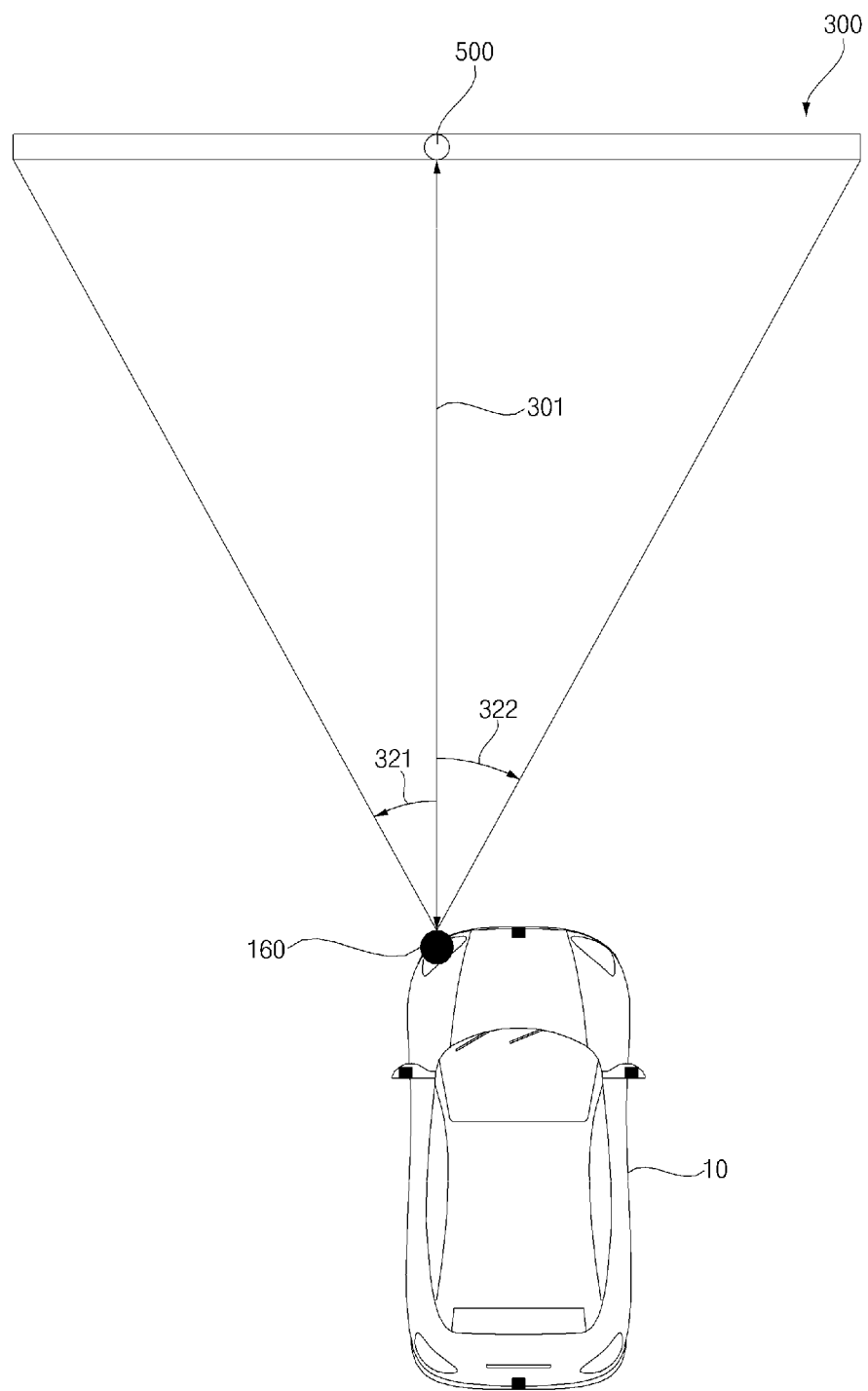
FIGS. 3 to 5 are diagrams illustrating examples of a first light distribution pattern according to an implementation.
Figure 4:
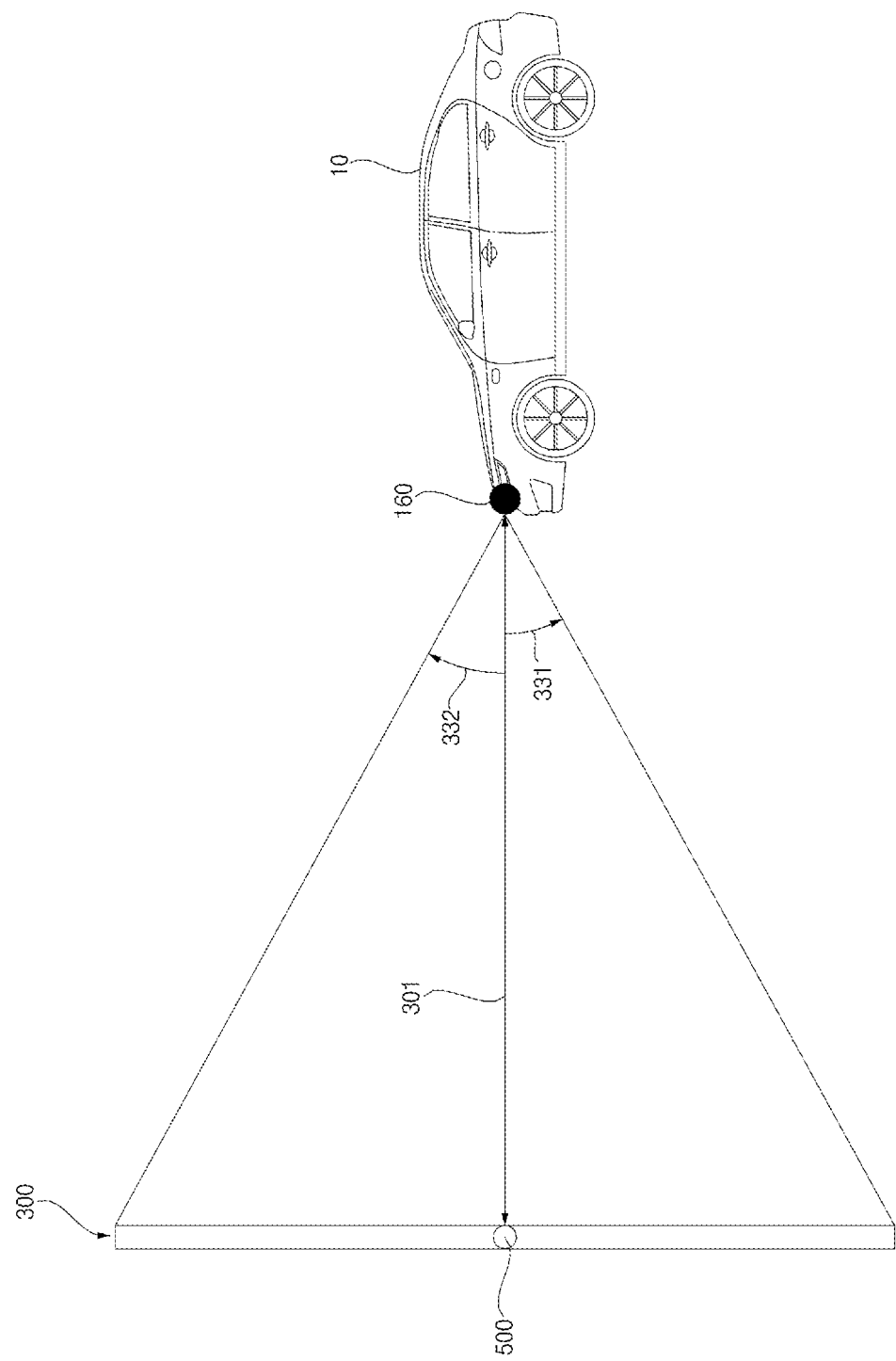
Figure 5:
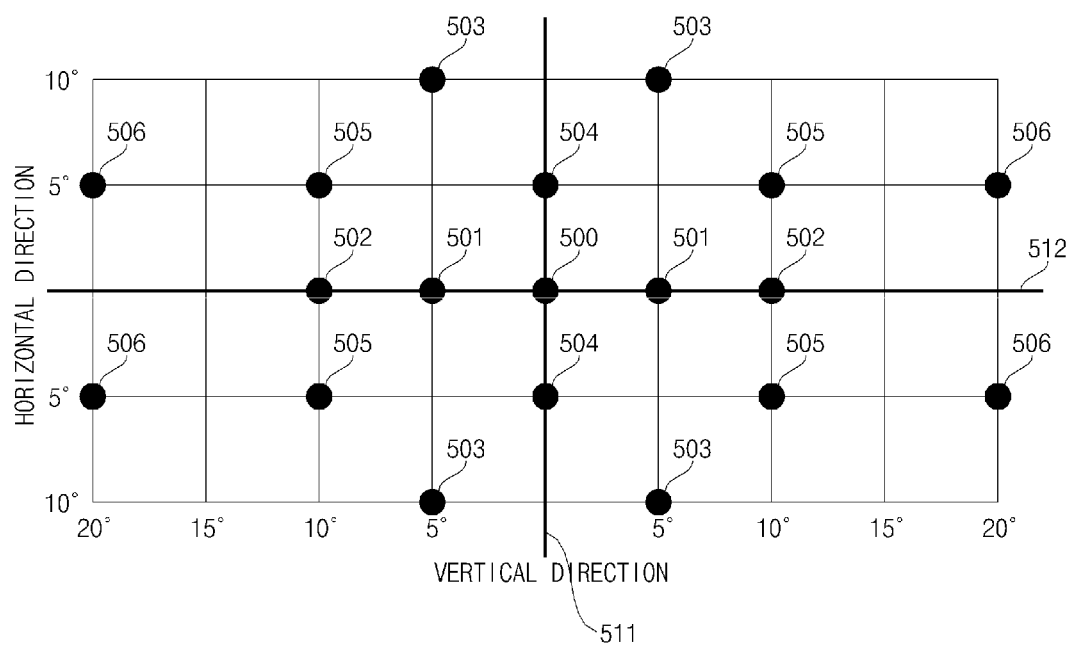

FIGS. 3 to 5 are diagrams for explanation of a first light distribution pattern according to an implementation.

Referring to the drawings, a screen 300 may be in a lattice shape.

In some scenarios, the first light distribution pattern may be described with a luminous intensity ratio between a central point and a plurality of intersections (a plurality of points) formed by the lattice shape of the screen 300.

The screen 300 may be divided into a left part and a right part by a centerline 511 which extends in an upward-downward direction (hereinafter, referred to as a vertical centerline).

The left side and the right side are from a user's perspective when viewing the screen 300 in the vehicle 10.

The vertical centerline 511 may be defined as a line that extends from the central point 500 in an upward-downward direction to be perpendicular to a horizontal centerline 512.

The screen 300 may be divided into an upper part and a lower part by a centerline 512 which extends in a left-right direction (hereinafter, referred to as a horizontal centerline).

The horizontal centerline 512 may be defined as a line that extends from the central point 500 in a left-right direction to be perpendicular to the vertical centerline 511.

A point at which the vertical centerline 511 and the horizontal centerline 512 intersect with each other is the central point 500.

The first light distribution pattern may be vertically symmetric with respect to the vertical centerline 511 on the screen 300.

The first light distribution pattern may be so that luminous intensity is gradually smaller from the central point 500 to first and second points 501 and 502 on the screen 300.

The first point 501 is a point formed on the horizontal centerline 512.

A virtual reference line 301 is a virtual line that connects the light generation unit 160 and the central point 500.

The first point 501 is a point at which an angle between the virtual reference line 301 and a first virtual line, connecting the light generation unit 160 and the first point 501, is 5 degrees with respect to the light generation unit 160.

For example, the first point 501 is a point which is positioned on the horizontal centerline 512 when the virtual reference line 301 is rotated through 3 degrees in the left direction 321 or the right direction 322 about the light generation unit 160.

The first light distribution pattern may be formed so that the first point 501 has 90% of luminous intensity of the central point 500.

The second point 502 may be a point formed on the horizontal centerline 512.

The second point 502 is a point at which an angle between the virtual reference line 301 and a second virtual line, connecting the light generation unit 160 and the second point 502, is 10 degrees with respect to the light generation unit 160.

For example, the second point 502 is a point which is positioned on the horizontal centerline 512 when the virtual reference line 301 is rotated through 10 degrees in the left direction 321 or the right direction 322 about the light generation unit 160.

The first light distribution pattern may be formed so that the second point 502 has 35% of luminous intensity of the central point 500.

The first light distribution pattern may be formed so that luminous intensity at the third point 503 on the screen 300 is smaller than luminous intensity at the first point 501.

The first point 501 and the third point 502 are points formed on the same vertical line.

The third point 503 is a point at which an angle between the reference line 301 and a third virtual line, connecting the light generation unit 160 and the third point 503, is 5 degrees in a horizontal direction with respect to the light generation unit 160.

The third point 503 is a point at which an angle between the reference line 301 and the third virtual line is 10 degrees in a vertical direction with respect to the light generation unit 160.

For example, the third point 503 is a point which is positioned when the virtual reference line 301 is rotated through 5 degrees in the left direction 321 or the right direction 322 and through 10 degrees in the downward direction 331 or the upward direction 332 about the light generation unit 160.

The first light distribution pattern may be formed so that the third point 503 has 20% of luminous intensity of the central point 500.

The first light distribution pattern may be formed to be horizontally symmetric with respect to the horizontal centerline 512 on the screen 300.

The first light distribution pattern may be formed so that luminous intensity at the fourth point 504 on the screen 300 is smaller than luminous intensity at the central point 500.

The fourth point 504 is a point formed on the vertical centerline 511.

The fourth point 504 is a point at which an angle between the virtual reference line 301 and a fourth virtual line, connecting the light generation unit 160 and the fourth point 504, is 5 degrees with respect to the light generation unit 160.

For example, the fourth point 504 is a point which is positioned when the reference line 301 is rotated through 5 degrees in the downward direction 331 or the upward direction 332 about the light generation unit 160.

The first light distribution pattern may be formed so that the fourth point 504 has 70% of luminous intensity of the central point 500.

The first light distribution pattern may be formed so that luminous intensity is gradually smaller from the fourth point 504 to the fifth to sixth points 505 and 506 on the screen 300.

The fourth to sixth points are points formed on the same horizontal line.

The fifth point 505 is a point at which an angle between the virtual reference line 301 and a fifth virtual line, connecting the light generation unit 160 and the fifth point 505, is 10 degrees in a horizontal direction with respect to the light generation unit 160.

The fifth point 505 is a point at which an angle between the reference line 301 and the fifth virtual line is 5 degrees in a vertical direction with respect to the light generation unit 160.

For example, the fifth point 505 is a point which is positioned when the reference line 301 is rotated through 10 degrees in the left direction 321 or the right direction 322 and through 5 degrees in the downward direction 331 or the upward direction 332 about the light generation unit 160.

The first light distribution pattern may be formed so that the fifth point 505 has 20% of luminous intensity of the central point 500.

The sixth point 506 is a point at which an angle between the reference line 301 and a sixth virtual line, connecting the light generation unit 160 and the sixth point 506, is 20 degrees in a horizontal direction with respect to the light generation unit 160.

The sixth point 506 is a point at which an angle between the reference line 301 and the sixth virtual line is 5 degrees in a vertical direction with respect to the light generation unit 160.

For example, the sixth point 506 is a point which is positioned when the virtual reference line 301 is rotated through 20 degrees in the left direction 321 or the right direction 322 and through 5 degrees in the downward direction 331 or the upward direction 332 about the light generation unit 160.

The first light distribution pattern may be formed so that the sixth point 506 has 10% of luminous intensity of the central point 500.

Figure 6:
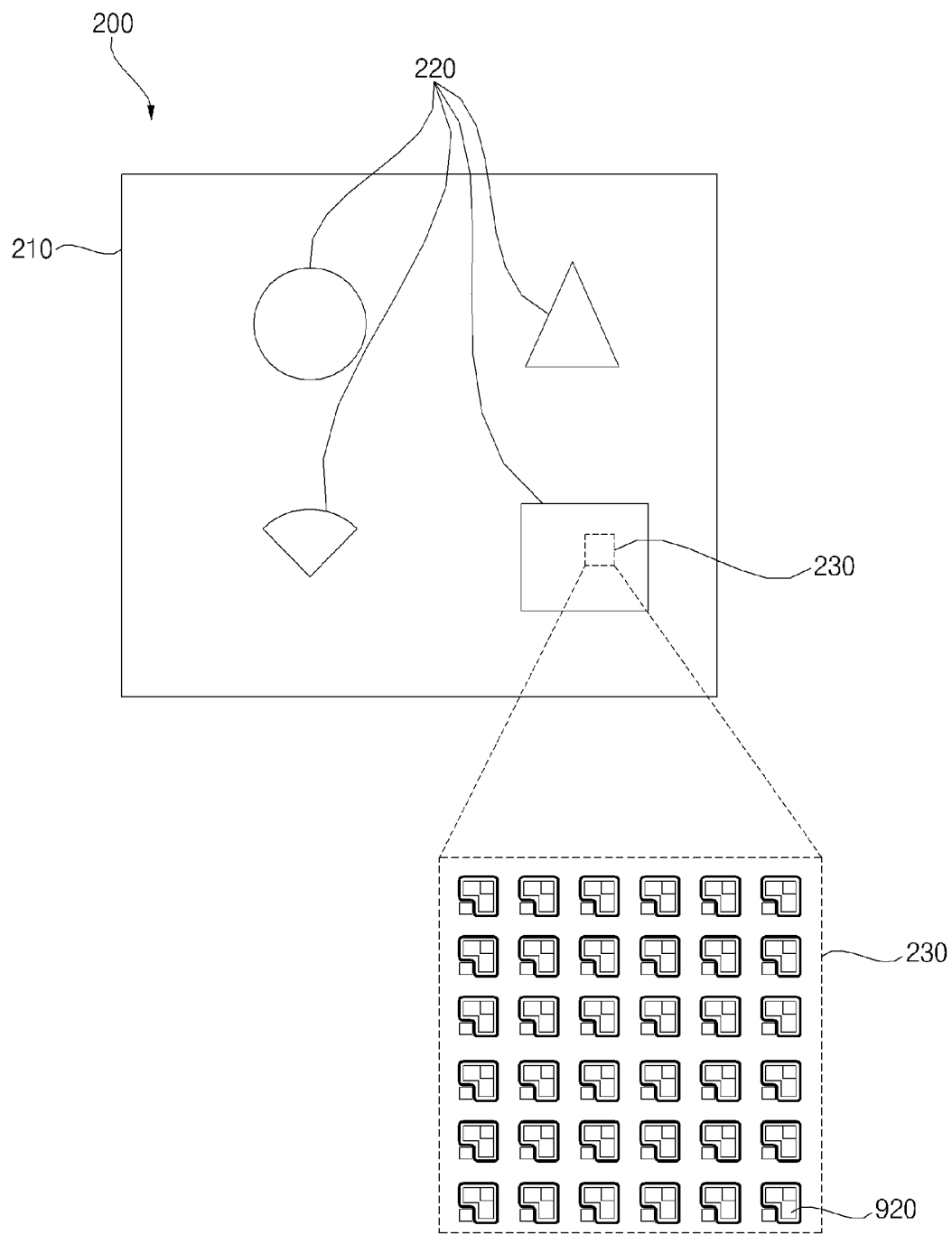
FIG. 6 is a diagram illustrating an example of an array module in which a plurality of micro-LED elements is disposed, according to an implementation.

FIG. 6 is a diagram for explanation of an array module in which a plurality of micro-LED elements is disposed, according to an implementation.

Referring to FIG. 6, the array module 200 may have a plurality of micro LED elements 920.

The plurality of micro LED elements 920 may be transferred onto the array module 200.

An interval and a density (e.g., the number of micro LED elements per unit area) of arrangement of the micro LED elements 920 on the array module 200 may be determined according to a transfer interval.

The array module 200 may include a base 210 and at least one subarray 220.

The base 210 may be formed of a polyimide (PI) material.

In some implementations, the base 210 may be a substrate. For example, the base 610 may be the FCCL substrate 910 (see FIG. 7) that will be described later.

The sub arrays 220 may be disposed on the base 210.

The plurality of micro LED elements 920 may be disposed on the subarray 220.

The subarray 220 may be made by cutting a main array that is formed with the plurality of micro LED elements 920 disposed on the FCCL substrate.

In this case, a shape of the subarray 220 may be determined by a shape to be formed by the rear combination lamp.

For example, the subarray 220 may have a two-dimensional (2D) shape (e.g., a circular shape, a polygonal shape, a fan shape, etc.).

Figure 7:
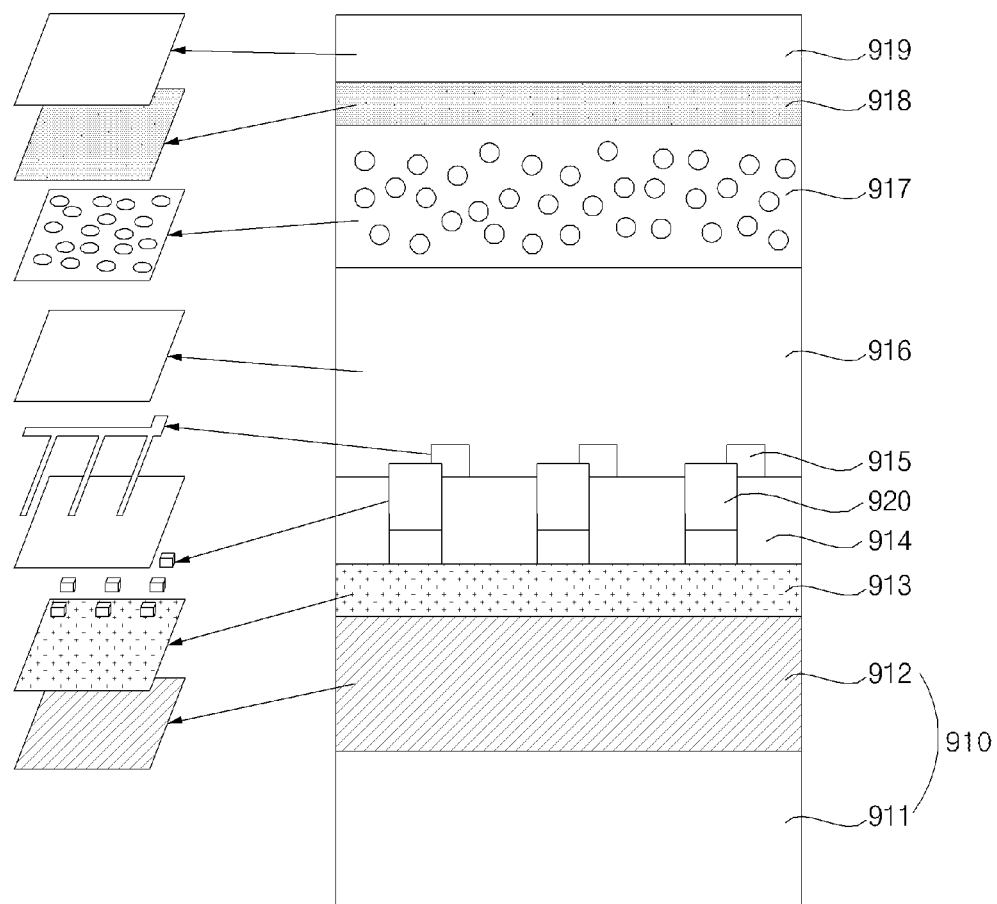
FIG. 7 is a diagram illustrating an example of an array module in which a plurality of micro LED elements is disposed, according to an implementation.

FIG. 7 is a diagram illustrating an array module in which a plurality of micro LED elements is disposed, according to an implementation.

Referring to FIG. 7, the array module 200 may include a FCCL substrate 910, a reflective layer 913, an inter-layer dielectric film 914, a plurality of micro LED elements 920, a second electrode 915, an optical spacer 916, a phosphor film 917, a color filter film 918, and a cover film 919.

The FCCL substrate 910 may include a polyimide (PI) film 911 and a first electrode 912.

In some implementations, each of the first electrode 912 and the second electrode 915 may be formed of Copper (Cu) and electrically connected to the plurality of micro LED elements 920 to supply power thereto.

The first electrode 912 and the second electrode 915 may be transmissive electrodes.

The first electrode 912 and the second electrode 915 may include a metal material which includes, for example, any one selected from among Ni, Pt, Ru, Ir, Rh, Ta, Mo, Ti, Ag, W, Cu, Cr, Pd, V, Co, Nb, Zr, Indium Tin Oxide (ITO), Aluminum Zinc Oxide (AZO), Indium Zinc Oxide (IZO), or an alloy thereof.

The first electrode 912 may be formed between the PI film 911 and the reflective layer 913.

The second electrode 915 may be formed on the inter-layer dielectric film 914.

The reflective layer 913 may be formed on the FCCL substrate 910. The reflective layer 913 may reflect light generated by the plurality of micro LED elements 920. The reflective layer 913 is desirably formed of Ag.

The inter-layer dielectric film 914 may be formed on the reflective layer 913.

The plurality of micro LED elements 920 may be formed on the FCCL substrate 910. The plurality of micro LED elements 920 may be attached to the reflective layer 913 or the FCCL substrate 910 by a solder material or an Anisotropic Conductive Film (ACF).

In some implementations, each micro LED element 920 may be a LED chip of 10 to 100 μm.

The optical spacer 916 may be formed on the inter-layer dielectric film 914. The optical spacer 916 is used to maintain a distance between the plurality of micro LED elements 920 and the phosphor film 917, and the optical spacer 916 may be formed of an insulating material.

The phosphor film 917 may be formed on the optical spacer 916. The phosphor film 917 may be resin in which a phosphor is distributed (e.g., evenly distributed). Depending on a wavelength of light emitted from the micro LEDs 920, any one selected from a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor may be applied as the phosphor.

For example, each phosphor may generate a second color excited by light of a first color emitted from the micro LED element 920.

The first filter film 918 may be formed on the phosphor film 917. The color filter film 918 may realize a specific color for light which has passed through the phosphor film 917. The color filter film 918 may realize color that is any one of red (R), green (G), blue (B), or a combination thereof.

The cover film 919 may be formed on the color filter film 918. The cover film 919 may protect the micro LED array.

FIG. 8 is a diagram illustrating an array module according to an implementation.

Referring to FIG. 8, the array module 200 may include a base 210 and a plurality of subarrays 801, 802L, 802R, 803L, 803R, 804L, 804R, 805, 806, and 807.

The base 210 may have the plurality of subarrays 801, 802L, 802R, 803L, 803R, 804L, 804R, 805, 806, and 807.

The plurality of subarray 801, 802L, 802R, 803L, 803R, 804L, 804R, 805, 806, and 807 may be disposed on the base 210.

A plurality of micro LED elements 920 may be disposed with the same density in each of the plurality of subarrays 801, 802L, 802R, 803L, 803R, 804L, 804R, 805, 806, and 807.

To form a first light distribution pattern, each of the plurality of subarrays 801, 802L, 802R, 803L, 803R, 804L, 804R, 805, 806, and 807 may have a different size according to a region (or position) where a corresponding subarray is disposed on the base 210.

Among the plurality of subarrays 801, 802L, 802R, 803L, 803R, 804L, 804R, 805, 806, and 807, the subarray 801 disposed at the central region of the base 210 may be greater than the subarrays 804L, 804R, 806, and 807 disposed at peripheral regions of the base 210.

The size of each of the plurality of subarrays 801, 802L, 802R, 803L, 803R, 804L, 804R, 805, 806, and 807 may be determined based on a region where a corresponding subarray is disposed on the base 210.

The plurality of subarrays 801, 802L, 802R, 803L, 803R, 804L, 804R, 805, 806, and 807 disposed on the base 210 may have sizes that are gradually smaller from the center to the periphery of the base 210.

The plurality of subarrays 802L, 802R, 803L, 803R, 804L, and 804R may have sizes that are vertically symmetric with respect to the first subarray 801 disposed at the center of the base 210.

The plurality of subarrays 801, 802L, 802R, 803L, 803R, 804L, and 804R may be disposed at intervals that are vertically symmetric with respect to the first subarray 801 disposed at the center of the base 210.

The plurality of subarrays 801, 802L, 802R, 803L, 803R, 804L, and 804R may be disposed such that the same number of subarrays is disposed on the left side and the right side of the first subarray 801 disposed at the center of the base 210.

The plurality of subarrays 805, 806, and 807 may have sizes that are horizontally asymmetric with respect to the first subarray 801 disposed at the center of the base 210.

Among the plurality of subarrays 805, 806, and 807, the subarrays 806 and 807 below the first subarray 801 may be greater than the subarray 807 above the first subarray 801.

The number of the subarrays 806 and 807 below the first subarray 801 disposed at the center of the base 210 may be greater than the number of the subarray 807 above the first subarray 801.

Figure 9A:
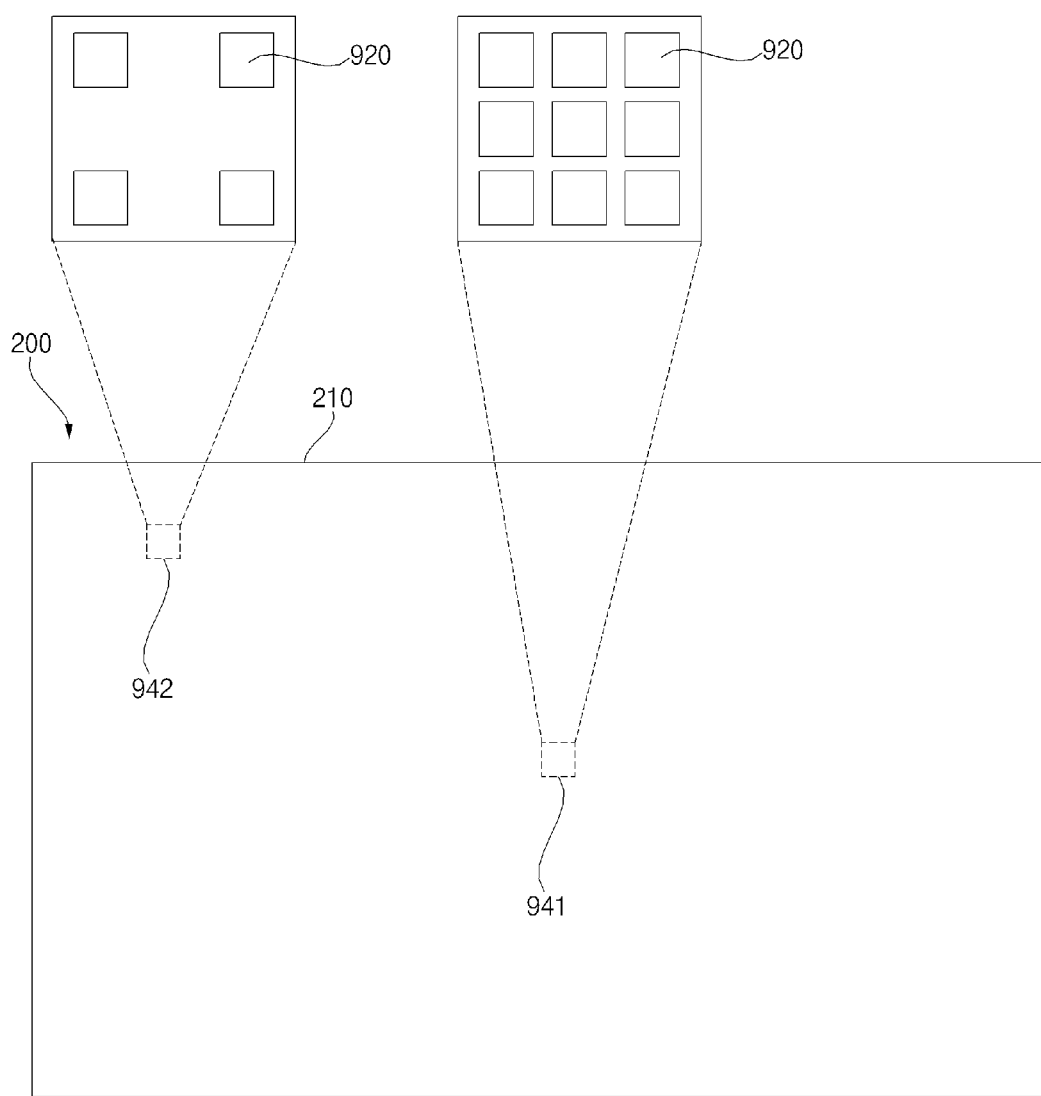
FIG. 9A is a diagram illustrating an example of an array module according to an implementation.

FIG. 9A is a diagram illustrating an array module according to an implementation.

Referring to FIG. 9A, a plurality of micro LED elements 920 may be disposed at uniform intervals on the base 210. In this case, the base 210 may be a substrate.

To form a first light distribution pattern, micro LED elements may be disposed at a different density in each region of the array module 200.

For example, the micro LED elements may be disposed at a different density in each region of the base 210.

As an example, a density may be defined as the number of micro LED elements per unit area.

The array module 200 may have a plurality of micro LED elements disposed at a density that is gradually smaller from a central region to a peripheral region of the array module 200.

For example, the plurality of the micro LED elements may be disposed at a density that is gradually smaller from a central region to a peripheral region of the base 210.

For example, a density of micro LED elements in the central region 941 of the base 210 may be greater than a density of micro LED elements in a peripheral region 942 of the base 210.

A density of micro LED elements over the array module 200 may be gradually smaller from the center to the periphery of the base 210.

The density of micro LED elements over the array module 200 may be vertically symmetric with respect to the center of the base 210.

The density of micro LED elements over the array module 200 may be horizontally asymmetric with respect to the center of the base 210.

A density of micro LED elements over the array module 200 may be such that a density of micro LED elements in a region below the center of the base 210 is greater than a density of micro LED elements in a region above the center of the base 210.

Figure 9B:
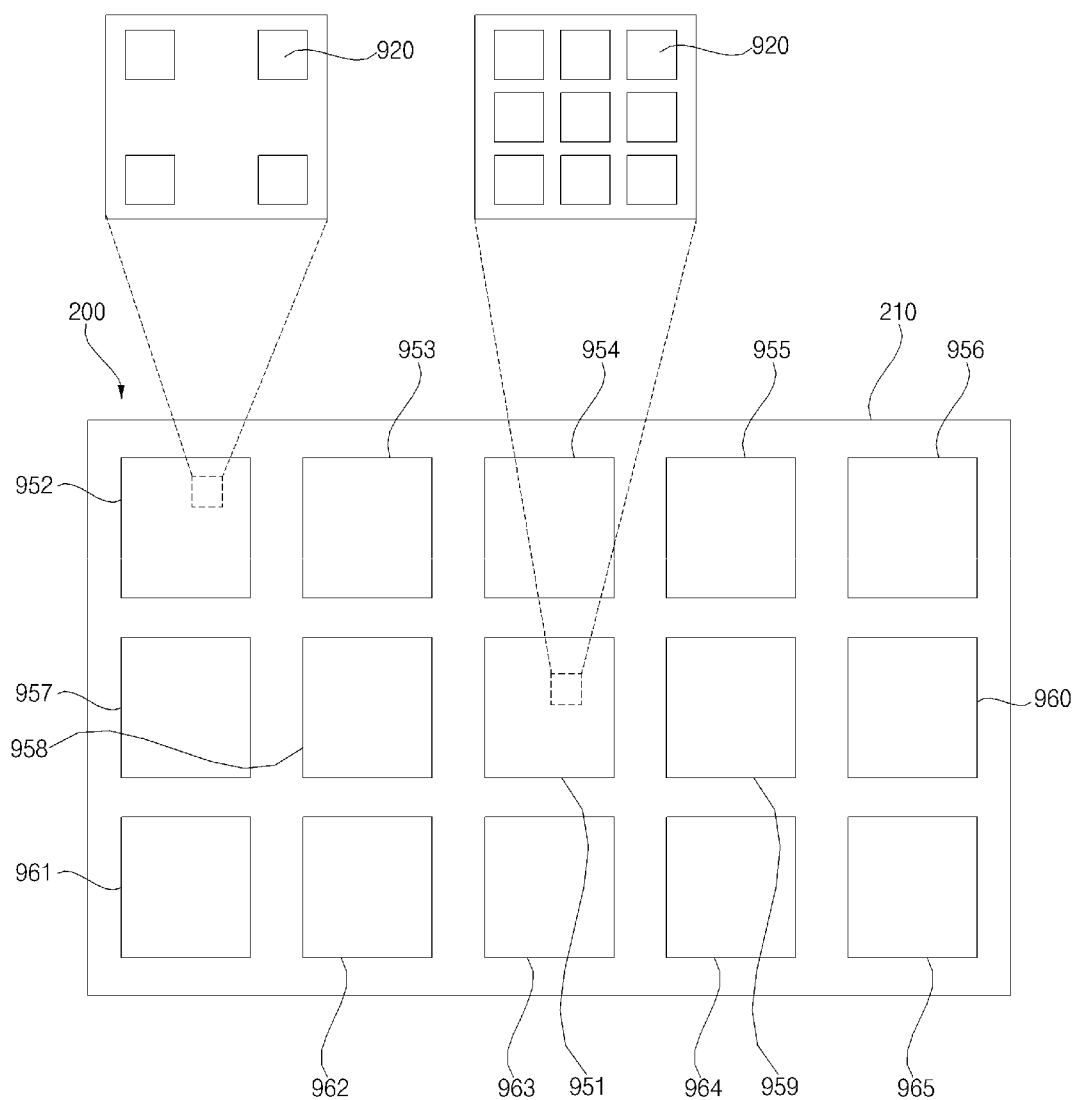
FIG. 9B is a diagram illustrating an example of an array module according to an implementation.

FIG. 9B is a diagram illustrating an array module according to an implementation.

Referring to FIG. 9B, the base 210 may have a plurality of subarrays 951 to 965.

The plurality of subarrays 951 to 965 may be disposed on the base 210.

The plurality of subarrays 951 to 965 may have the same size.

The plurality of subarrays 951 to 965 may be disposed on the base 210 at uniform intervals. Alternatively, the plurality of subarrays 951 to 965 may be disposed on the base 210 at non-uniform intervals.

To form a first light distribution pattern, a density of micro LED elements in the subarray 951 disposed in a central region of the base 210 may be greater than a density of micro LED elements in the subarray 952 disposed in a peripheral region of the base 210.

The plurality of subarrays 951 to 965 may have a density that is vertically symmetric with respect to a first subarray 951 disposed at the center of the base 210.

The plurality of subarrays 951 to 965 may have a density that is horizontally asymmetric with respect to the first subarray 951 disposed at the center of the base 210.

A density of micro LED elements in the first subarray 951 below the first subarray 951 may be greater than a density of micro LED elements in the subarray 954 above the first subarray 951.

Figure 10A:
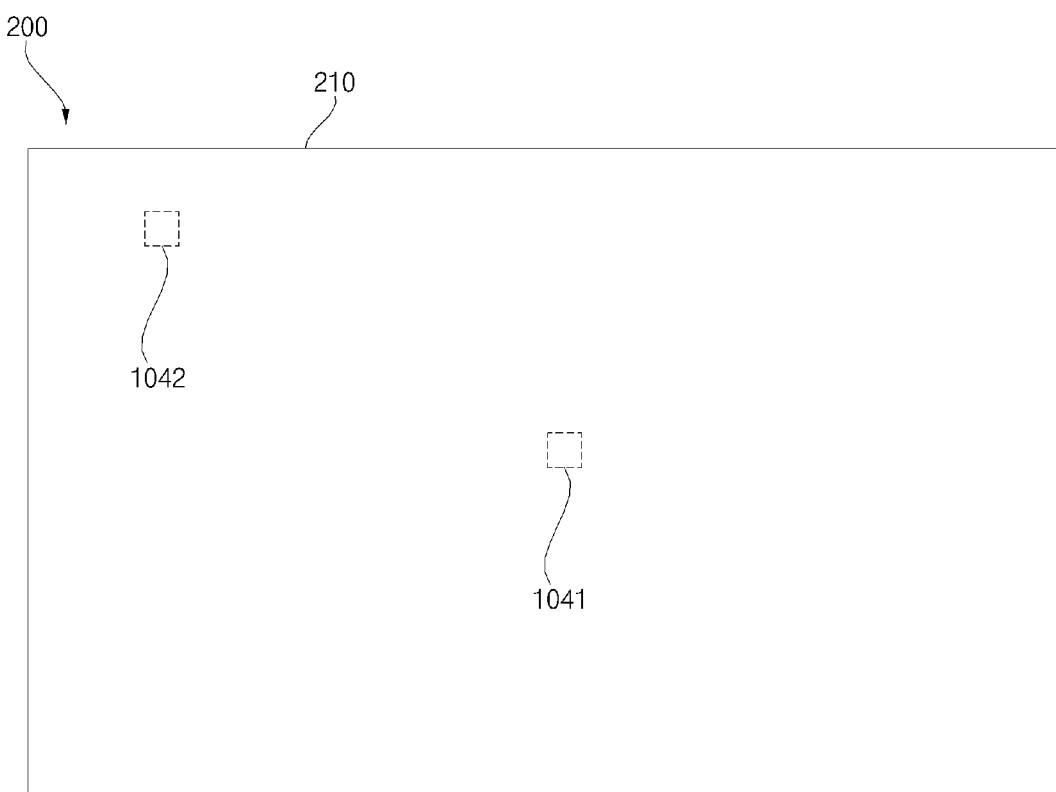
FIG. 10A is a diagram illustrating an example of an array module according to an implementation.

FIG. 10A is a diagram illustrating an array module according to an implementation.

Referring to FIG. 10A, a plurality of micro LED elements 920 is disposed on the base 310 at uniform intervals. In this case, the base 210 may be a substrate.

To form a first light distribution pattern, the processor 170 may supply a different amount of electrical energy to each region of the array module 200.

For example, the processor 170 may supply electrical energy whose amount is gradually smaller from the central region to the periphery of the array module 200.

For example, the processor 170 may perform a control operation, so that an amount of current supplied to micro LED elements in a central region 1041 is greater than an amount of current supplied to micro LED elements in a peripheral region 1042.

For example, the processor 170 may perform a control operation, so that an amount of current to be supplied to micro LED elements is gradually smaller from the center to the periphery of the base 210.

For example, the processor 170 may perform a control operation, so that an amount of supplied current is vertically symmetric with respect to the center of the base 210.

For example, the processor 170 may perform a control operation, so that an amount of supplied current is horizontally asymmetric with respect to the center of the base 210.

For example, the processor 170 may perform a control operation, so that an amount of current supplied to a region below the center of the base 210 is greater than an amount of current supplied to a region above the center of the base 210.

FIG. 10B is a diagram illustrating an array module according to an implementation.

Referring to FIG. 10B, the base 210 may have a plurality of subarrays 1001 to 1015.

The plurality of subarrays 1001 to 1015 may be disposed on the base 210.

The plurality of subarrays 1001 to 1015 may have the same size.

The plurality of subarrays 1001 to 1015 may have the same density.

To form a first light distribution pattern, the processor 170 may supply a different amount of electrical energy to each of the plurality of subarrays 1001 to 1015.

For example, the processor 170 may supply electrical energy whose amount is gradually smaller from the central region to the peripheral region of the base 210.

For example, the processor 170 may perform a control operation, so that an amount of electrical energy supplied to the subarray 1001 in a central region of the base 210 is greater than an amount of electrical energy supplied to a subarray 1002 in a peripheral of the base 210.

For example, the processor 170 may perform a control operation, so that an amount of electrical energy to be supplied to subarrays is gradually smaller from a central region to a peripheral region of the base 210.

For example, the processor 170 may perform a control operation, so that an amount of current to be supplied is vertically symmetric with respect to the first subarray 1001 disposed at the center of the base 210.

For example, the processor 170 may perform a control operation, so that an amount of current to be supplied is horizontally asymmetric with respect to the first subarray 1001 disposed at the center of the base 210.

For example, the processor 170 may perform a control operation, so that an amount of current supplied to a subarray 1013 below the subarray 1001 disposed at the center of the base 210 is greater than an amount of current supplied to a subarray 1004 above the subarray 1001.

Figure 11:
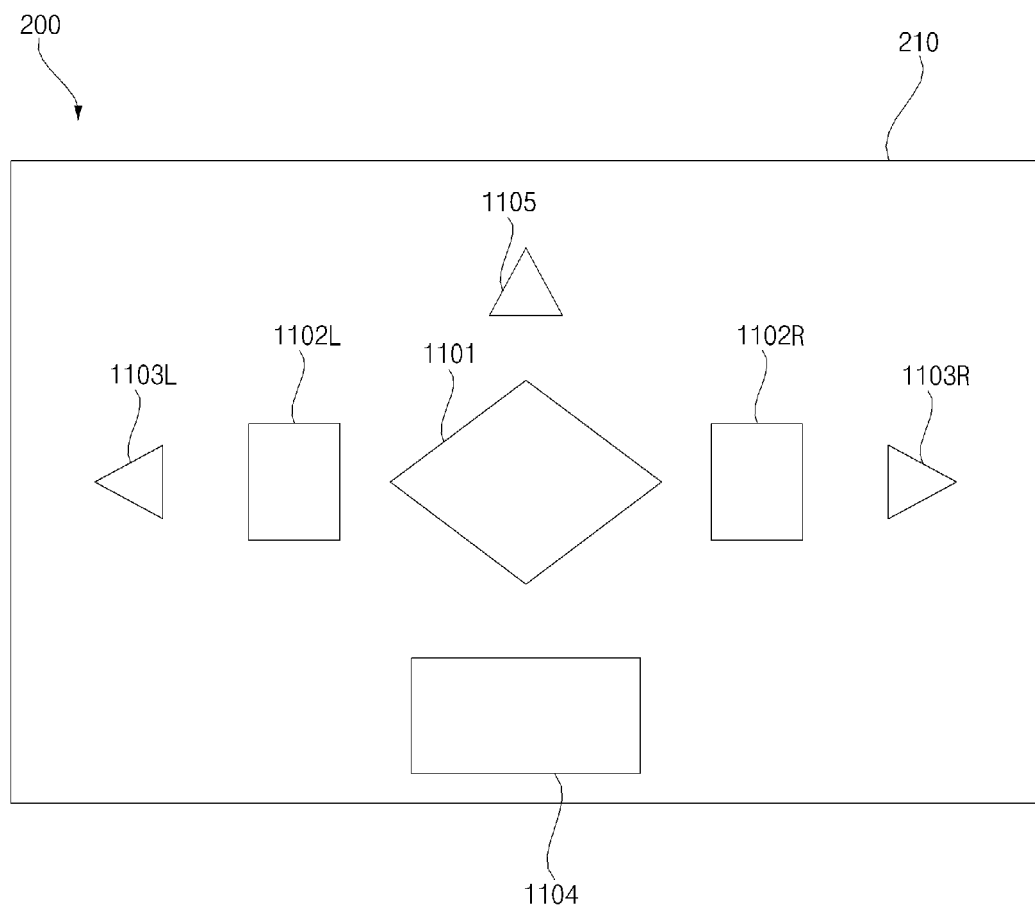
FIG. 11 is a diagram illustrating an example of an array module according to an implementation.

FIG. 11 is a diagram illustrating an array module according to an implementation.

Referring to FIG. 11, the base 210 may have a plurality of subarrays 1101, 1102L, 1102R, 1103L, 1103R, 1104, and 1105.

The plurality of subarrays 1101, 1102L, 1102R, 1103L, 1103R, 1104, and 1105 may be disposed on the base 210.

To form a first light distribution, each of the plurality of subarrays 1101, 1102L, 1102R, 1103L, 1103R, 1104, and 1105 may have a different shape according to a region where a corresponding subarray is disposed on the base 210.

An amount of output light is different depending on a shape of a subarray.

The shape of each of the plurality of subarrays 1101, 1102L, 1102R, 1103L, 1103R, 1104, and 1105 may be determined based on an amount of output light.

Figure 12A:
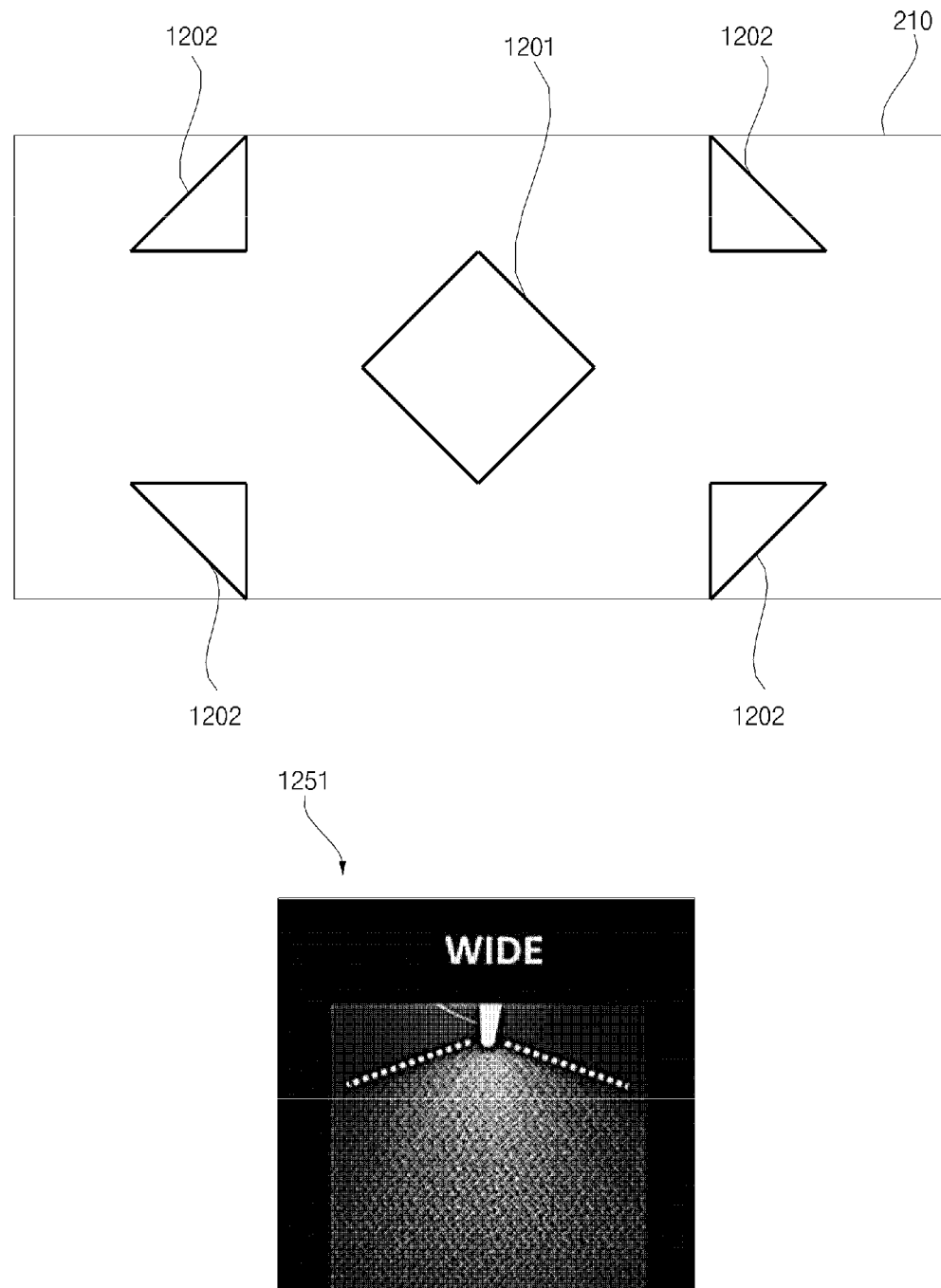

FIGS. 12A and 12B are diagrams illustrating an array module according to an implementation.

In some implementations, FIGS. 12A and 12B may represent experimental results about a pattern of output light determined based on sizes and shapes of subarrays.

As illustrated in FIG. 12A, a first array 1201 may be disposed at a central region of the base 210, and four second subarrays 1202 may be disposed in a peripheral region of the base 210.

The first subarray 1201 may have a first size. The first sub array 1201 may have a first rhombus shape.

The second subarrays 1202 may have a second size. The second subarrays 1202 may have an isosceles right triangle shape.

In this case, a pattern of output light may have a shape indicated by reference numeral 1251.

As illustrated in FIG. 12B, a first subarray 1211 may be disposed at the center of the base 210, and four second subarrays 1212 may be disposed at the periphery of the base.

The first subarray 1201 may have a third size. The first subarray 1201 may have a second rhombus shape.

The second subarrays 1202 may have a fourth size. The second subarrays 1202 may have a rectangular shape.

In this case, a pattern of output light may have a shape indicated by reference numeral 1252.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A lamp for a vehicle, the lamp comprising:
   a light generation unit comprising an array module on which a plurality of micro Light Emitting Diode (micro-LED) elements is disposed; and
   at least one processor configured to perform operations comprising:
      controlling at least one first micro-LED element of the light generation unit to generate a first luminous intensity at a central point of a light distribution pattern; and
      controlling at least one second micro-LED element of the light generation unit to generate a second luminous intensity at a peripheral point of the light distribution pattern, the second luminous intensity being smaller than the first luminous intensity such that a luminous intensity of the light distribution pattern is progressively smaller from the central point of the light distribution pattern to the peripheral point of the light distribution pattern.

2. The lamp according to claim 1, wherein the central point is a point located at the center of the light distribution pattern that, when projected on a vertical plane at a first distance from the light generation unit, has a highest luminous intensity among points in the light distribution pattern.

3. The lamp according to claim 2, wherein the operations further comprise:
   controlling at least the first micro-LED element and the second micro-LED element of the light generation unit to produce the light distribution pattern in a manner that is vertically symmetric with respect to a vertical centerline of the light distribution pattern.

4. The lamp according to claim 3, wherein the operations further comprise:
   controlling at least the first micro-LED element and the second micro-LED element of the light generation unit to produce the light distribution pattern in a manner that has a luminous intensity that is progressively smaller from the central point to a first point, and from the first point to a second point of the light distribution pattern;
   wherein the first point and the second point are arranged on a horizontal centerline of the light distribution pattern,
   wherein the first point is a point at which an angle between a reference line, connecting the light generation unit and the central point, and a first virtual line, connecting the light generation unit and the first point, is 5 degrees with respect to the light generation unit;
   wherein the second point is a point at which an angle between the reference line and a second virtual line, connecting the light generation unit and the second point, is 10 degrees with respect to the light generation unit, and
   wherein the first distance is from 2 m to 4 m.

5. The lamp according to claim 4, wherein controlling at least the first micro-LED element and the second micro-LED element of the light generation unit comprises:
   controlling at least the first micro-LED element and the second micro-LED element of the light generation unit to produce the light distribution pattern in a manner that has a luminous intensity at the first point that is 90% of the luminous intensity at the central point, and a luminous intensity at the second point that is 35% of the luminous intensity at the central point.

6. The lamp according to claim 4, wherein controlling at least the first micro-LED element and the second micro-LED element of the light generation unit comprises:
   controlling at least the first micro-LED element and the second micro-LED element of the light generation unit to produce the light distribution pattern in a manner that has a luminous intensity at a third point that is smaller than a luminous intensity at the first point, and that is 20% of a luminous intensity of the central point,
   wherein the first and third points are on a same vertical line, and
   wherein the third point is a point at which an angle between the reference line and a third virtual line, connecting the light generation unit and the third point, is 5 degrees in a horizontal direction and 10 degrees in a vertical direction with respect to the light generation unit.

7. The lamp according to claim 4, wherein controlling at least the first micro-LED element and the second micro-LED element of the light generation unit comprises:
   controlling at least the first micro-LED element and the second micro-LED element of the light generation unit to produce the light distribution pattern in a manner that is horizontally symmetric with respect to the horizontal centerline of the light distribution pattern.

8. The lamp according to claim 7, wherein controlling at least the first micro-LED element and the second micro-LED element of the light generation unit comprises:
   controlling at least the first micro-LED element and the second micro-LED element of the light generation unit to produce the light distribution pattern in a manner that has a luminous intensity at a fourth point that is 70% of the luminous intensity of the central point,
   wherein the fourth point is on the vertical centerline and is a point at which an angle between a reference line, connecting the light generation unit and the central point, and a fourth virtual line, connecting the light generation unit and the fourth point, is 5 degrees with respect to the light generation unit.

9. The lamp according to claim 8, wherein controlling at least the first micro-LED element and the second micro-LED element of the light generation unit comprises:
controlling at least the first micro-LED element and the second micro-LED element of the light generation unit to produce the light distribution pattern in a manner that has a luminous intensity that is progressively smaller from the fourth point to a fifth point, and from the fifth point to a sixth point on the light distribution pattern,
wherein the fourth to sixth points are formed on a same horizontal line,
wherein the fifth point is a point at which an angle between the reference line and a fifth virtual line, connecting the light generation unit and the fifth point, is 10 degrees in a horizontal direction and 5 degrees in a vertical direction with respect to the light generation unit, and
wherein the sixth point is a point at which an angle between the reference line and a sixth virtual line, connecting the light generation unit and the sixth point, is 20 degrees in a horizontal direction and 5 degrees in the vertical direction with respect to the light generation unit.

10. The lamp according to claim 9, wherein controlling at least the first micro-LED element and the second micro-LED element of the light generation unit comprises:
controlling at least the first micro-LED element and the second micro-LED element of the light generation unit to produce the light distribution pattern in a manner that has a luminous intensity at the fifth point that is 20% of the luminous intensity at the central point, and a luminous intensity at the sixth point that is 10% of the luminous intensity at the central point.

11. The lamp according to claim 2, wherein the first distance is 3 m.

12. The lamp according to claim 1,
wherein the array module comprises:
a base; and
a plurality of subarrays disposed on the base, and
wherein each of the plurality of subarrays has a different size according to a region where the subarray is disposed on the base.

13. The lamp according to claim 12, wherein, among the plurality of subarrays, a first subarray positioned closer to a center of the base has a size that is greater than a size of a second subarray positioned further from the center of the base.

14. The lamp according to claim 1, wherein:
the array module comprises a first region and a second region, and
the plurality of micro-LED elements comprises:
a first plurality of micro-LED elements disposed in the first region with a first density; and
a second plurality of micro-LED elements disposed in the second region with a second density.

15. The lamp according to claim 14, wherein the array module has the plurality of micro-LED elements disposed with a density that is progressively smaller from a central region to a peripheral region of the array module.

16. The lamp according to claim 1, wherein the operations further comprise:
supplying a first amount of electrical energy to a first region of the array module; and
supplying a second amount of electrical energy to a second region of the array module.

17. The lamp according to claim 16, wherein supplying the first amount of electrical energy to the first region of the array module and supplying the second amount of electrical energy to the second region of the array module comprises:
supplying electrical energy of an amount that is progressively smaller from a central region of the array module to a peripheral region of the array module.

18. The lamp according to claim 1,
wherein the array module comprises:
a base; and
a plurality of subarrays disposed on the base, and
wherein each of the plurality of subarrays has a different shape according to a region where the subarray is disposed on the base.

19. The lamp according to claim 1, wherein the lamp is configured to operate as a rear combination lamp of the vehicle.

20. A vehicle comprising:
a plurality of wheels;
a power source configured to drive a rotation of at least one of the plurality of wheels; and
a lamp comprising:
a light generation unit comprising an array module on which a plurality of micro Light Emitting Diode (micro-LED) elements is disposed; and
at least one processor configured to perform operations comprising:
controlling at least one first micro-LED element of the light generation unit to generate a first luminous intensity at a central point of a light distribution pattern; and
controlling at least one second micro-LED element of the light generation unit to generate a second luminous intensity at a peripheral point of the light distribution pattern, the second luminous intensity being smaller than the first luminous intensity such that a luminous intensity of the light distribution pattern is progressively smaller from the central point of the light distribution pattern to the peripheral point of the light distribution pattern.

* * * * *